Figure 1:
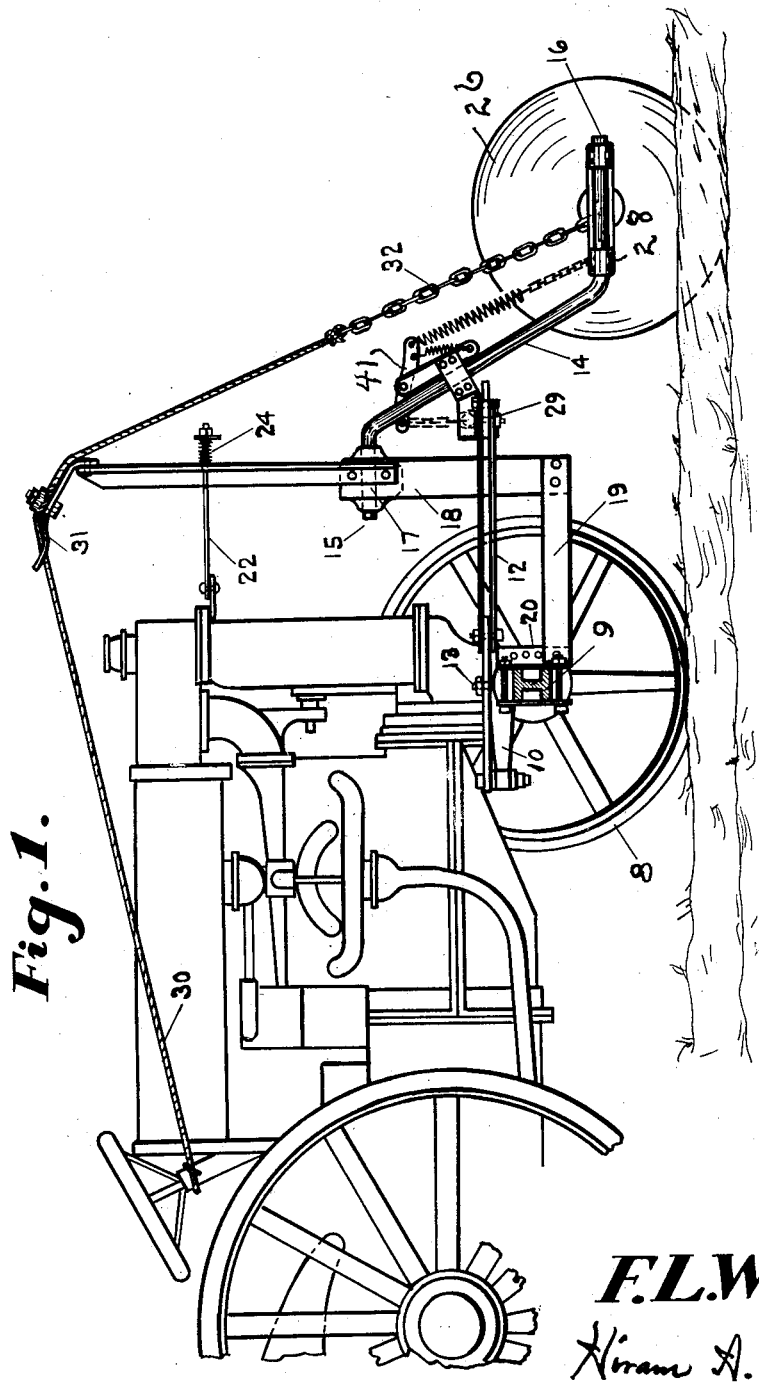

July 4, 1933. F. L. WILLRODT 1,916,546
TRACTOR GUIDE
Filed July 19, 1930 4 Sheets-Sheet 1

Inventor
F.L.Willrodt
Hiram A. Sturges Attorney

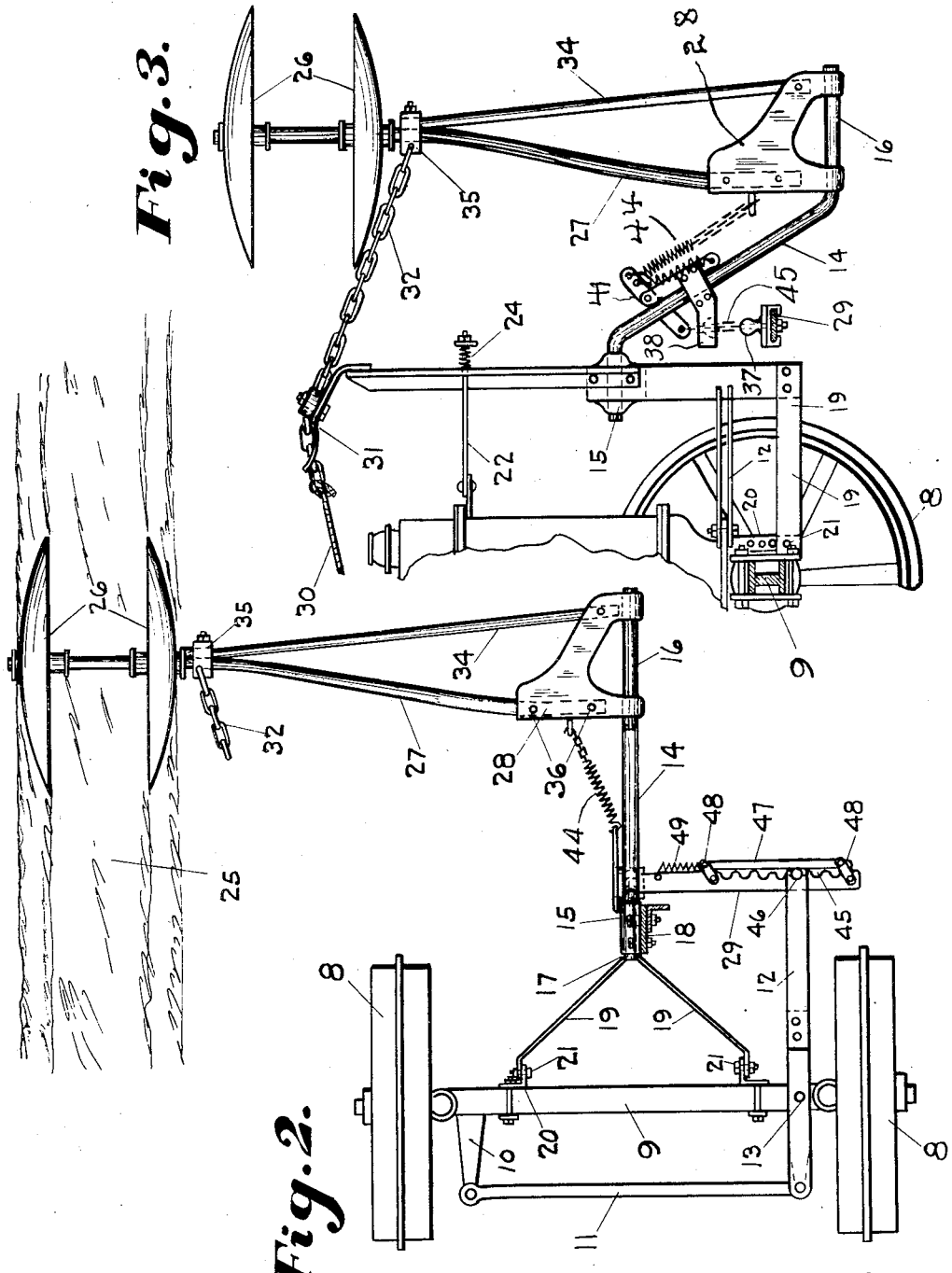

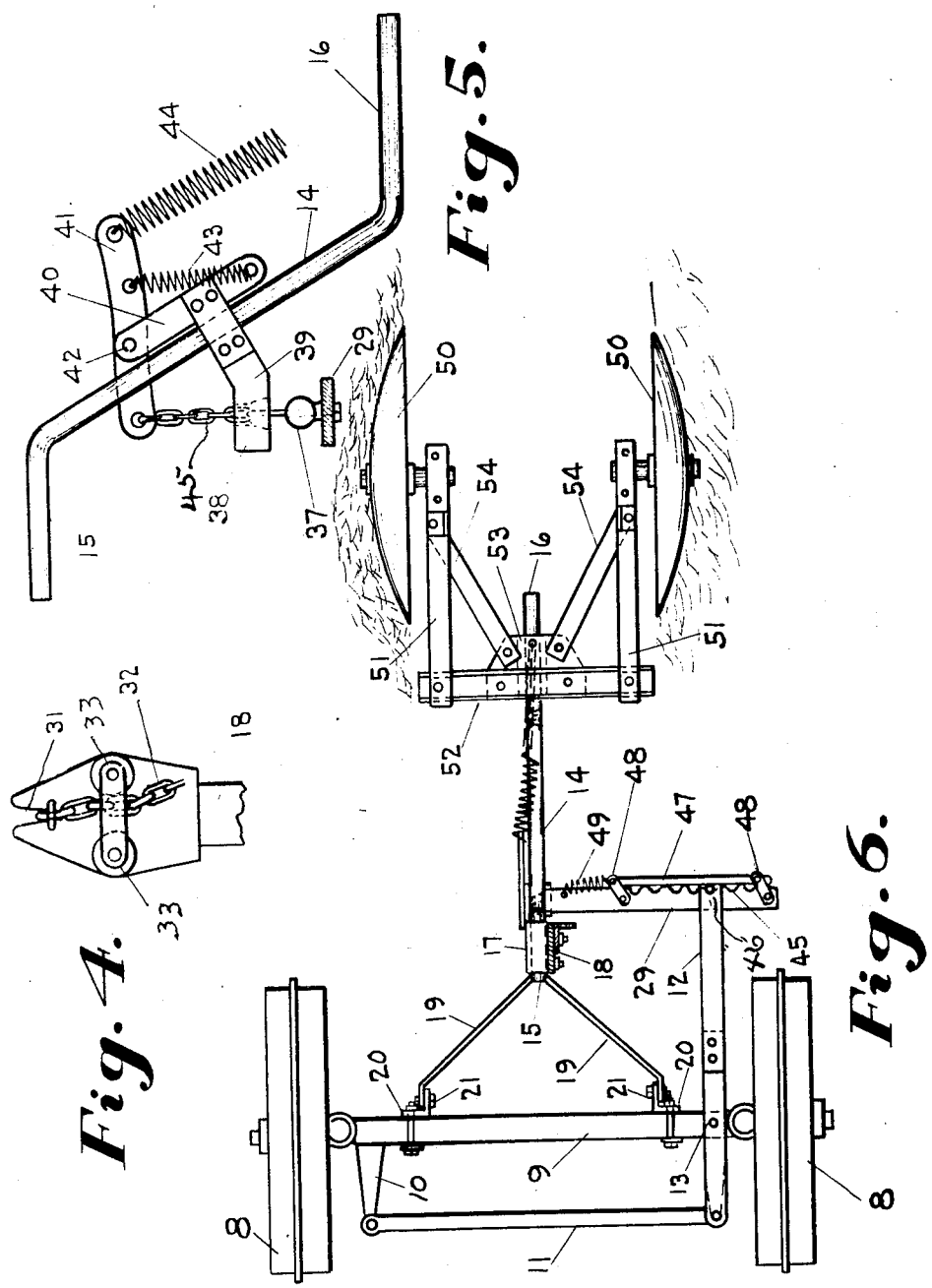

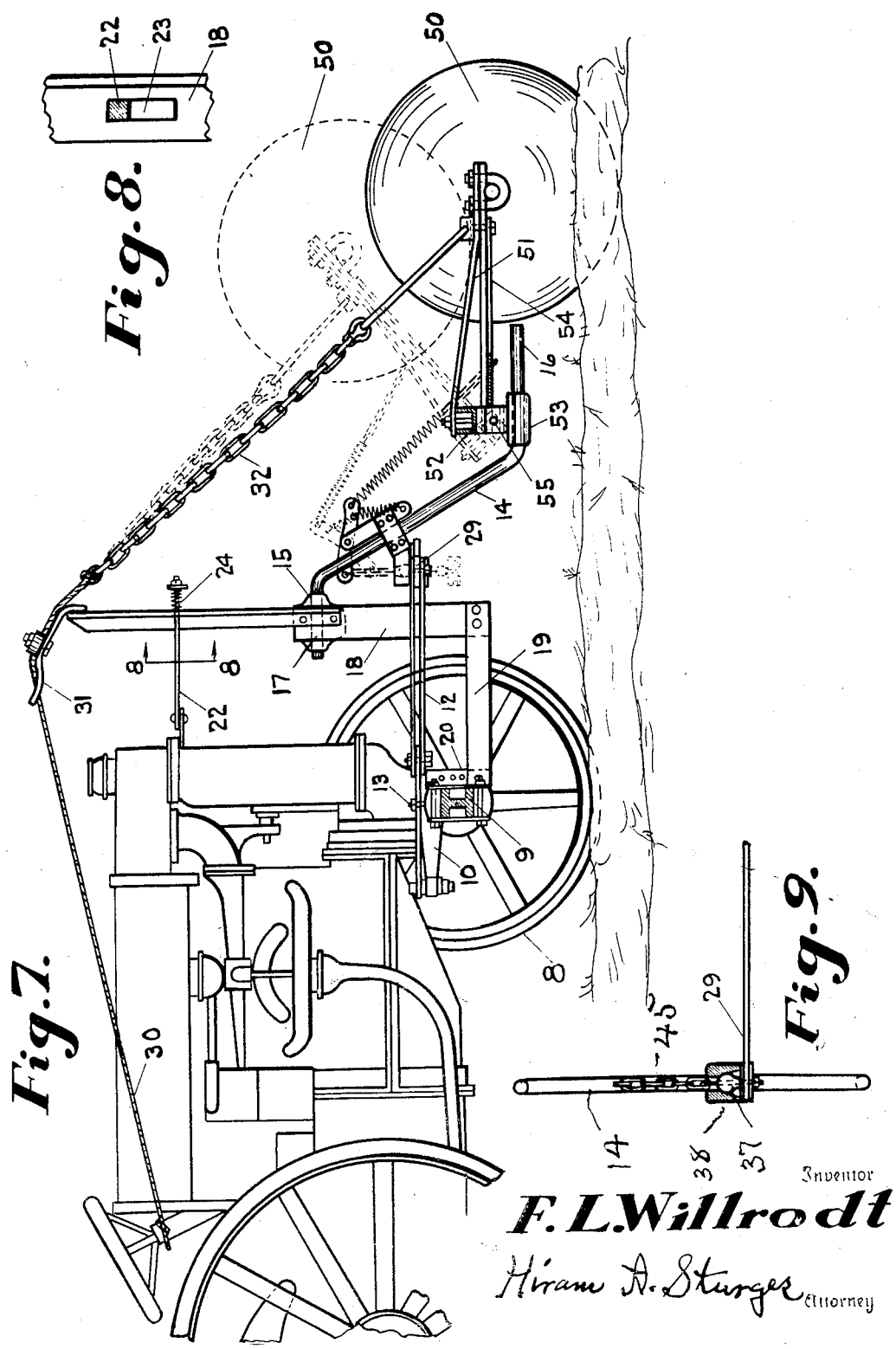

Patented July 4, 1933

1,916,546

UNITED STATES PATENT OFFICE

FRED L. WILLRODT, OF OMAHA, NEBRASKA, ASSIGNOR TO THE WILLRODT TRACTOR GUIDE COMPANY, OF OMAHA, NEBRASKA, A CORPORATION OF NEBRASKA

TRACTOR GUIDE

Application filed July 19, 1930. Serial No. 469,143.

This invention relates to an automatic guide for tractors found to be very useful in the work of plowing, listing and cultivating, the operation of automatic steering of the tractor depending upon a guide engaging in a furrow or channel, whereby, if the furrow or channel is of curved form the tractor will be guided and will move on a corresponding curve so that plows, listers or cultivators will be drawn in a manner to turn furrows of uniform widths, and that a lister will form ridges at uniform distances from each other and that the rows of corn or other crops may be cultivated without injury or impairment of their growth.

One of the objects of the invention is to provide a rockbar for the tractor upon which various kinds of guides may be mounted.

Another object is to provide an improvement in the tractor guide described in U. S. Letters Patent No. 1,639,246, issued Aug. 16, 1927, to F. L. Willrodt for Steering attachments for tractors, the object being to accomplish automatic steering by use of few and simple parts and economy in manufacture.

This invention consists of the novel and useful construction, combination and arrangement of parts described herein and illustrated in the accompanying drawings, it being understood that only one embodiment of the invention is disclosed, and that changes may be made in form, size, proportions and minor details, said changes being within the scope of the invention as claimed.

In the drawings, Fig. 1 shows a side view of a part of a tractor with the attachment mounted thereon for steering the tractor when plowing or listing. Fig. 2 is a plan view of the parts shown in Fig. 1, parts of the tractor being omitted. Fig. 3 is a side view relating to Fig. 2 showing the guide supported in a vertical position.

Fig. 4 is a plan view of a chain-holder. Fig. 5 is a side view of the rock-bar and a resiliently operated frame mounted thereon, the control-bar being in section. Fig. 6 is a plan view similar to the view shown in Fig. 2, the guides shown in Figs. 2 and 3 being removed from the rock-bar and the guide shown in Fig. 6 substituted therefor. Fig. 7 is a side view of the parts showing the guide illustrated in Fig. 6. Fig. 8 is a sectional view on line 8—8 of Fig. 7. Fig. 9 is a sectional detail showing the mounting of the control-bar on the frame of the rock-bar.

Referring now to the drawings for a more particular description, the invention is shown and described in connection with a tractor provided with wheels 8, an axle 9, steering mechanism for the tractor consisting of spindle-arms 10 for moving the wheels 8 transversely and a connecting-bar 11 pivotally mounted at its ends upon the arms 10. The steering mechanism thus mentioned is operated by a steering-arm 12 which extends forwardly and, is pivotally mounted between its ends as indicated at 13 on the tractor.

In order that the objects may be attained as first mentioned, I provide a rock-bar 14 of angular form having a horizontal head-piece 15 and horizontal foot-piece 16 best shown in Fig. 5 of the drawings, the head-piece 15 being pivotally mounted at 17 on a standard 18 to permit transverse swinging movements.

The standard 18 is disposed at the front of the tractor. It is provided with a pair of foot-bars or branches 19, each being mounted on a bracket 20 by a horizontal pivot-pin 21, whereby the standard may have limited swinging movements forwardly and rearwardly but will be prevented from swinging in directions transversely of the tractor.

In order to provide the correct operation of parts in the present instance it is desirable to provide such a mounting for the rock-bar 14 that it may have its pivotal mounting at the medial line of the tractor and therefore any swinging movement of the standard transversely of the tractor should be prevented.

It is desirable, however, to permit the standard to have a limited rocking movement in a vertical plane, and therefore the leaders 19 may swing from the horizontal pivots 21 mentioned.

Numeral 22 indicates a horizontal supporting-bar for the standard, the latter being provided with a slot 23 (Fig. 8) for receiving the bar 22. Numeral 24 indicates a spring which is mounted on the bar 22 to operate as a resilient control for the rocking movements of the standard and tending to prevent vibration of the parts during operation.

It will thus be seen that the weight of the standard is supported, in part, by the bar 22 and that its limited rocking movements are under control, in part, by said bar 22.

The automatic steering of the tractor will first be explained in connection with the work of plowing and listing, and in such cases a furrow 25 (Fig. 2) which may be straight or curved is depended upon for steering the tractor. Numeral 26 indicates a guide adapted to travel in said furrow in advance of the tractor. The guide consists of a pair of discs 26 which are journalled on the distal end of a swing-bar 27, the inner end of said bar being adjustably mounted on a casting 28, and since the casting is pivotally mounted on the foot-piece 16 of the rock-bar it may have swinging movements in an arc approximately of a half-circle. Also it will be understood that a swinging movement of the rock-bar may be caused by the guide 26. If the furrow has a longitudinal curvature the guide will, of course, cause a longitudinal movement of the swing-bar, and this movement of the swing-bar will cause a swinging movement of the rock-bar.

Numeral 29 indicates a control-bar which is connected at one of its ends with the rock-bar, its opposite end being connected with the steering-arm 12, and therefore, a swinging movement of the rock-bar will actuate said steering-arm for actuation of the steering mechanism of the tractor.

During operation the guide will normally remain in the furrow and no attention of an operator is required except when "turning about" at the end of the field. When the tractor arrives at the end of the furrow the operator lifts the guide and swing-bar to approximately a vertical position as shown in Fig. 3 of the drawings by use of a pull-rope 30.

As shown in Figs. 1, 3 and 7 of the drawings the upper end of the standard 18 is provided with a clamping device or holder 31 for a chain, cable or rope, and an operator by use of the rope, may easily cause the swing-bar to move to a vertical position so that it may be held while the tractor is "turned about".

As best shown in Fig. 4 of the drawings the recess of the chain-holder 31 is approximately of V-shape. Since a cable or rope might become unduly worn I have used a chain-section 32 secured at one of its ends to the bar 27, and after it has been moved between the pair of rollers 33 (Fig. 4), one of its links may become caught between the prongs of the holder 31, the opposite end of the chain section being connected with the pull-rope 30.

After the tractor has been "turned about" the operator, by causing a swinging movement of the rope 30 may cause the chain to be released from the holder 31 to permit the swing-bar to move downwardly for engagement of the guide in a furrow, and it will be understood that when the tractor is used for listing, the swing-bar and guide 26 may be moved in an arc of a half-circle so that the guide may engage in a furrow.

Numeral 34 indicates a brace-bar which is mounted at its inner end on the casting 28, its outer end being mounted on a collar 35. The inner end of the swing-bar 27 is secured by keepers 36 to the casting 28, and therefore the swing-bar may be adjusted longitudinally and the brace-bar 34 may be also mounted at longitudinal intervals on the swing-bar since the collar 35 may be secured to the swing-bar at selected intervals thereof.

In order that the tractor may be "turned about" by moving on a half-circle of limited radius the control-bar is provided with such a connection with the rock-bar that it will be automatically detached therefrom as soon as the operator causes the tractor to move on said half-circle, and as soon as the tractor has completed its movement of the half-circle the control-bar will automatically become attached to the rock-bar.

The flexible connection thus mentioned for the inner end of the control-bar with the rock-bar is an important feature since the tractor on account of said connection may be "turned about" without loss of time and on a very limited circular area.

By referring to Fig. 2 of the drawings it will be seen that if the wheels 8 of the tractor were turned to the left the steering-arm 12 would also swing in the same direction and the control-bar therefore would be pushed toward the rock-bar. Any ordinary pivotal mounting of the control-bar on the rock-bar would not permit a circular movement of the tractor on a very limited area, and therefore I employ a flexible connection for these parts which, while of simple construction, is effective in operation.

The inner end of the control-bar is provided with a ball 37 and at 38 is indicated a ball-housing or downwardly opening socket adapted to receive the ball, said housing being a part of a bracket 39 which is rigidly secured to the rock-bar 14. At 40 is indicated a link which is rigidly secured to the bracket 39 and at 41 is indicated a lever which is pivotally mounted at 42 between its ends to permit it to swing from the end of the link 40 subject to the control of springs 43 and 44 which are attached to one end of the lever, a chain 45 being attached to the opposite end of the lever 41 and also connected with the ball 37.

It will be understood that the ball, by action of the springs will normally be disposed in the housing 38 and will remain in its housing at all times except when the steering-arm causes the ball 37 to move out from its socket 38.

The spring 43 is attached at its lower end to a fixed point on the rock-bar 14 and the spring 44 is attached at its lower end to the guide bar or swing-bar 27, at a point spaced from its pivotal connection to the rock-bar. Because of this method of connection, the spring 44 is placed under greater tension when the guides are in lowered or operative position than when they are in upright or inoperative position, and thus there is a greater force acting to retain the ball 37 in the housing 38 when the guides are in operative position.

In operation a curvature of the furrow will cause a longitudinal movement of the swing-bar and a transverse swinging movement of the rock-bar. This swinging movement of the rock-bar will cause a longitudinal movement of the control-bar and horizontal swinging movement of the steering-arm for moving the steering mechanism of the tractor, the springs 43 and 44 operating to maintain the ball 37 in its socket.

However, at the end of the field the tractor must be "turned about" and after the swing-bar and guide have been elevated as shown in Fig. 3 of the drawings the operator may cause the tractor to turn a half-circle on a very limited area, and as soon as the wheels 8 swing sharply for a quick movement to the "near" side the ball 37 will be forced outwardly from its socket 38 against the force of the springs 43 and 44, and as soon as the circular turn has been completed the springs will cause the ball to return to its socket.

The flexible mounting for the control-bar as described could be dispensed with, but if not used the circular movement of the tractor when "turning about" would of course cover a large area and would result in a loss of time.

By referring to Fig. 2 of the drawings it will be seen that the control-bar 29 may be adjusted longitudinally relative to the steering-arm 12. Notches 45 are formed at intervals in one side of the control-bar and the steering-arm has a projection 46 which may be maintained in any selected notch 45 by means of the contact-bar 47 which is mounted on the control-bar by pivotally mounted links 48, and by means of a helical spring 49 the contact-bar is normally pressed toward the control-bar for holding the projection 46 in the notch, and for adjusting the control-bar, the contact-bar may be swung outwardly against the force of the spring 49.

The advantage in the use of the adjustments just described is to control the travel of the tractor so that it will move in a line further from or nearer to the line of movement of the guide 26 this being of advantage when plowing since the width of the furrow may be changed. When plowing ground covered with heavy sod a narrow furrow may be desired and a wide furrow would be desired for loose ground.

Figs. 6 and 7 illustrate the use of the invention in connection with the cultivation of corn or other crops which are disposed in rows. It will be understood that corn is planted in rows, said rows being disposed in uniformly spaced relation, the ground being generally listed for this purpose, and that the operation of listing causes channels and ridges in alternation to be formed parallel with the direction of travel of the tractor and lister, and that corn is planted in the channels or longitudinal depressions, and therefore the rows of corn are approximately parallel and may be cultivated to advantage by use of the present invention.

As best shown in Fig. 6 of the drawings I provide a tract or guide adapted to be disposed at the front and at the medial line of the tractor consisting, in part, of a pair of discs 50 journalled in a pair of parallel side-bars 51, the rear ends of said bars being secured to a cross-bar 52. Numeral 53 indicates a sleeve which is secured to the foot-piece 16 of the rock-bar 14. Numerals 54 indicate a pair of braces for maintaining the bars 51 parallel with reference to each other. The parts just described provide a frame having a pivotal mounting 55 on the sleeve 53 to permit said frame together with the discs 50 to be swung upwardly by use of the rope 30 when "turning about" at the end of a field, the elevated position of parts being indicated by dotted lines in Fig. 7 of the drawings. In making such a turn the operator first raises the guides to inoperative position as shown in Figure 3 by pulling on the strand 30. This relaxes the tension on the spring 44, thus making it much easier for the ball 37 to slip out of its socket in the ball housing 38 when the steering mechanism of the tractor is operated for making the turn.

Since the discs 50 travel in a channel or furrow they will guide the tractor while the latter moves forwardly.

It will be understood that if the channel has curvatures the discs 50 operating as a guide will cause the rock-bar to swing and that the control-bar 29 and steering-arm 12 will be actuated the same as heretofore described for automatically steering the tractor.

It has been stated that the rows of corn are disposed in the channels between the ridges. During operation, the wheels of the tractor are disposed on the ridges and are maintained thereon by action of the discs or guide 50 while moving in the channels, and it will be understood that cultivators (not shown) are employed, these being disposed at the rear of the tractor and drawn thereby for cultivating the ground between the rows.

It will be seen that when the pull-rope 30 is used for moving the swing-bar 27 and guide 26 to the vertical position mentioned the springs 43 and 44 will be retracted to permit the ball 37 to move out from its socket without directing undue stresses to these parts or to the rock-bar, and this is also true relative to the upward swinging movement from its pivotal mounting 55 of the side-bars 51 and guide 50. When these parts have been swung downwardly the springs will be expanded for maintaining the ball in its socket.

I claim as my invention,—

1. In a steering attachment for tractors, a steering arm connected with the steering mechanism of the tractor, a rock-bar normally disposed in a vertical plane at the front and mounted on the tractor to permit swinging movements of its lower end transversely to the line of draft, a control-bar mounted on the rock-bar and connected with the steering-arm, a swing-bar mounted pivotally at its inner end upon the lower end of the rock-bar and provided at its outer end with a guide for engaging in a furrow, means on the swing-bar and rock-bar for adjusting the swing-bar for disposing the guide at selected distances from the rock-bar, said swing-bar being movable to actuate the rock-bar, said control-bar, the steering-arm and steering mechanism of the tractor.

2. In a steering attachment for tractors, an upright rock-bar mounted on the tractor, a steering-arm connected with the steering mechanism of the tractor, a spring-controlled lever pivotally mounted on the rock-bar, a control-bar flexibly connected with said lever and connected with the steering-arm, a swing-bar mounted on the rock-bar and having a guide adapted to travel in a furrow and being movable for actuating the rock-bar, said control-bar and said steering-arm for moving the steering mechanism of the tractor.

3. In a steering attachment for tractors, a steering-arm connected with the steering mechanism of the tractor, an upright rock-bar pivotally mounted on the tractor, a resiliently arranged frame pivotally mounted on the rock-bar, a swing-bar mounted on the rock-bar and having a guide adapted to travel in a furrow, and a control-bar connected with the steering-arm and flexibly connected with the frame of the rock-bar, said swing-bar being movable for actuating the rock-bar, said control-bar and steering-arm for moving the steering mechanism of said tractor.

4. In a steering attachment for tractors, a steering-arm connected with the steering mechanism of the tractor, an upright rock-bar mounted on the tractor to permit swinging movements of its lower end transversely of the line of draft of said tractor, a spring-controlled frame pivotally mounted on the rock-bar, a control-bar flexibly connected at one of its ends to the frame of the rock-bar and arranged to be pivotally connected at selected longitudinal intervals thereof to said steering-arm, a swing-bar pivotally mounted on the rock-bar and having a guide for engaging in a furrow, said swing-bar being movable for actuating the rock-bar, the control-bar and steering-arm.

5. In a steering attachment, for tractors, an upright rock-bar pivotally mounted at its upper end on the tractor, a spring-controlled frame pivotally mounted on the rock-bar, a steering-arm connected with the steering mechanism of the tractor and having a projection, a control-bar provided with notches at longitudinal intervals to provide adjustable mountings for the projection of the steering-arm and flexibly connected with the frame of the rock-bar, a swing-bar having a guide adapted to travel in a furrow and mounted on the rock-bar to permit swinging movements in a circle's arc, and adapted to be moved longitudinally for actuating said rock-bar, said control-bar and steering-arm.

6. In a steering attachment for tractors, a standard disposed at the front and mounted on the tractor to permit swinging movements in a vertical plane relative to said tractor, an upright rock-bar mounted on the standard to permit transverse swinging movements relative to the tractor, a steering-arm connected with the steering mechanism of the tractor, a control-bar mounted on the rock-bar and connected with the steering-arm, a swing-bar having a guide for engaging in a furrow and mounted on the rock-bar and adapted to be moved for moving the rock-bar and control-bar to cause actuation of the steering-arm.

7. In a steering attachment for tractors, a steering-arm connected with the steering mechanism of the tractor, a standard at the front of the tractor and mounted to permit swinging movements in vertical planes from the axle of said tractor; a rock-bar mounted on the standard to permit swinging movements transversely of the tractor, a control-bar mounted on the rock-bar and connected with the steering-arm, a swing-bar having a guide adapted to travel in a furrow and mounted on the rock-bar to permit swinging movements transversely of the line of draft and adapted to be moved longitudinally for actuating the rock-bar, said control-bar and steering-arm.

8. In a steering attachment for tractors, a standard at the front of the tractor mounted on the axle to permit swinging movements in vertical planes and provided with a V-shaped holder, a steering-arm connected with the steering mechanism of the tractor, a rock-bar mounted on the standard to permit rocking movements, a control-bar mounted on the rock-bar and connected with the steering-arm, a swing-bar having a guide for engaging in a furrow and mounted on the rock-bar to permit a swinging movement to a vertical position, and a strand connected with the swing-bar for engaging the V-shaped holder.

9. In a steering attachment for tractors, a steering-arm connected with the steering mechanism of the tractor, a standard disposed at the front and pivotally secured to the tractor for swinging movement on a transverse horizontal axis, resilient means for limiting forward swinging movement of said standard, a rock-bar mounted to permit swinging movements from the standard, a control-bar mounted on the rock-bar, means for connecting the steering-arm with the control-bar at selected intervals longitudinally of said bar, a swing-bar having a guide for engaging in a furrow and mounted on the rock-bar and adapted to be moved for actuating the rock-bar, said control-bar and said steering-arm.

10. In a steering attachment for tractors, a steering-arm connected with the steering mechanism of the tractor, a standard mounted upon and adapted to have swinging movements upwardly from the axle, means to limit the swinging movements of the standard, an upright rock-bar having a head-piece pivotally mounted on the standard and provided with a foot-piece, a control-bar mounted on the rock-lever and adjustably connected with the steering-arm, a swing-bar having a guide for engaging in a furrow and mounted on the foot-piece of the rock-bar, adjustable means on the swing-bar and rock-bar for increasing or decreasing the length of the swing-bar, said swing-bar being movable for actuating the rock-bar, said control-bar and steering-arm.

11. In a steering attachment for tractors, a steering arm operatively connected with a steering wheel of the tractor to impart steering movement thereto, a rock bar normally disposed in a vertical plane and mounted on the tractor to permit swinging movements of one end thereof transversely of said tractor, a notched control bar operatively and adjustably connected with said rock bar and with said steering arm, a spring-urged releasable connection between said rock-bar and steering arm, and a guide for engaging in a furrow and adapted to thereby be moved for moving said rock bar, said control bar and said steering arm.

12. In a steering attachment for tractors, a steering arm operatively connected with a steering wheel of the tractor to impart steering movement thereto, a rock bar mounted on the tractor to permit swinging movements of one end thereof, a guide for engaging in a furrow and adapted to thereby be moved for moving said rock bar, said guide being movably mounted relative to said rock bar to assume either of two steering positions on opposite sides of said tractor, an operative, disengageable connection between said rock bar and said steering arm including a control spring placed under tension when the guide is in either of its operative positions and adapted to be relaxed to permit disengaging said connection when said guide assumes an intermediate position between said two steering positions thereof.

13. In a steering attachment for tractors, a steering arm operatively connected with a steering wheel of the tractor to impart steering movement thereto, a rock-bar mounted on the tractor to permit swinging movements of one end thereof, a guide for engaging in a furrow and adapted to thereby be moved for moving said rock-bar, said guide being movably mounted relative to said rock-bar and adapted to assume a substantially horizontal operative position for engaging the furrow or a substantially vertical inoperative position, a releasable connection between said rock-bar and said steering arm including a control spring placed under tension when the guide is in operative position and adapted to be re relaxed to permit release of said connection when the guide assumes inoperative position, to thereby permit normal steering of the tractor.

14. In a steering attachment for tractors, a steering arm operatively connected with the steering mechanism of the tractor to impart steering movement thereto, a supporting bar pivotally mounted on the tractor, a guide for engaging in a furrow and adapted to thereby be moved for moving said supporting bar, said guide being movably connected to said supporting bar to assume a substantially horizontal position for engaging in a furrow or a substantially vertical inoperative position, and a releasable connection between said supporting bar and said steering arm including a control spring placed under tension when the guide is in operative position and adapted to be relaxed to permit release of said connection when the guide is in inoperative position.

15. In a steering attachment for tractors, a steering arm operatively connected with the steering mechanism of the tractor to impart steering movement thereto, a supporting bar pivotally mounted on the tractor, a guide for engaging in a furrow and adapted to thereby be moved for moving said supporting bar, said guide being movably connected to said supporting bar to assume a substantially horizontal position for engaging in a furrow or a substantially vertical inoperative position, a ball housing on said supporting bar, a ball connected with said steering arm, and a flexible resilient retaining means connected with said ball for normally holding it in said ball housing, said retaining means being relaxed when the guide is in operative position to permit said ball to leave the housing and to thereby permit normal steering of the tractor.

In testimony whereof, I affix my signature.

FRED L. WILLRODT.